(No Model.)
K. P. ALSTON, Jr.
COTTON AND CORN PLANTER.
No. 322,772. Patented July 21, 1885.
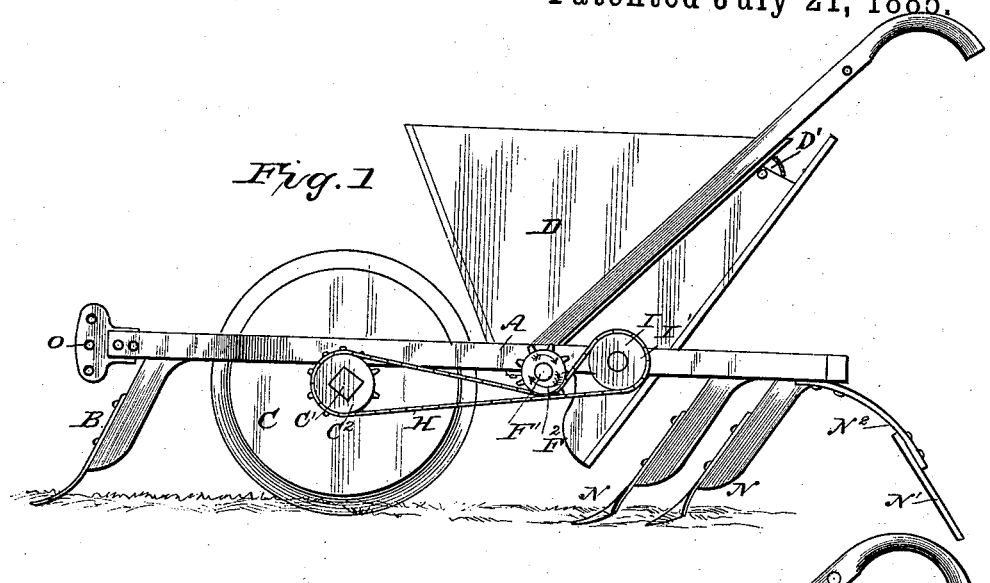
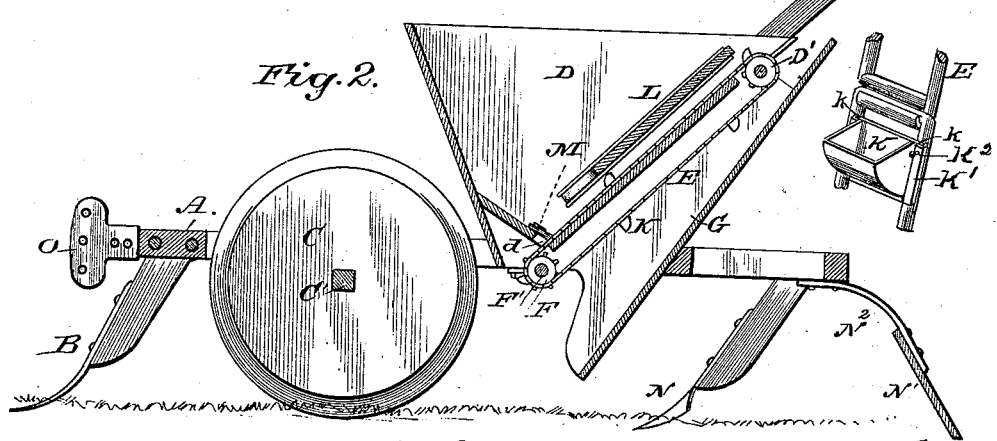
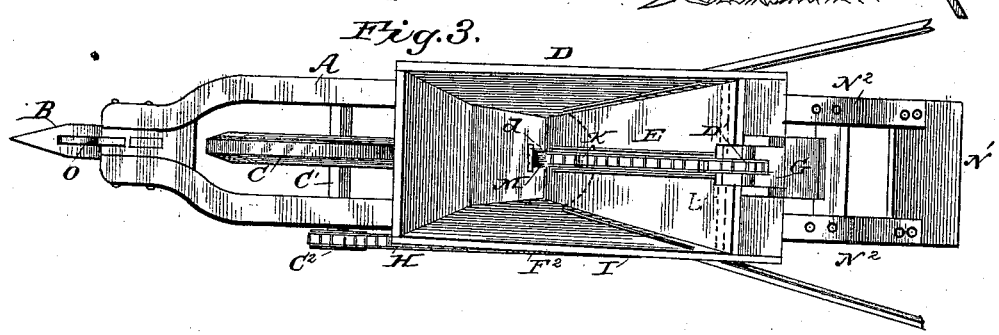
WITNESSES:
Fred. G. Dieterich.
J. Fred. Reily.
INVENTOR.
Kemp P. Alston, Jr.
by Louis Bagger & Co.
ATTORNEYS.

UNITED STATES PATENT OFFICE.

KEMP P. ALSTON, JR., OF LEOTA LANDING, MISSISSIPPI.

COTTON AND CORN PLANTER.

SPECIFICATION forming part of Letters Patent No. 322,772, dated July 21, 1885.

Application filed May 29, 1885. (No model.)

*To all whom it may concern:*

Be it known that I, KEMP P. ALSTON, Jr., a citizen of the United States, and a resident of Leota Landing, in the county of Washington and State of Mississippi, have invented certain new and useful Improvements in Cotton and Corn Planters; and I do hereby declare that the following is a full, clear, and exact description of the invention, which will enable others skilled in the art to which it appertains to make and use the same, reference being had to the accompanying drawings, which form a part of this specification.

My invention relates to cotton and corn planters; and it consists in the improved construction of a planter which is equally adapted for planting cotton, corn, peas, beans, &c., and in which the seed placed in the hopper are elevated by removable cups or teeth, secured upon an endless traveling chain, to the top of the chute or spout, down which they are discharged to enter the furrow, the number and size of the buckets used being regulated according to the nature of the seed being planted and the distance apart at which it is desired to sow the seed.

My invention further consists in certain combinations and sub-combinations, the nature of which will be hereinafter fully described, and pointed out in the claims.

Referring to the annexed drawings, Figure 1 is a side elevation of my improved planter. Fig. 2 is a longitudinal vertical sectional view of the same, taken through the center of the machine; and Fig. 3 is a top plan view with the slide removed.

The same letters of reference indicate corresponding parts in all the figures.

Referring to the several parts by letter, A represents the frame, which supports the various operative parts of the machine in their operative positions.

B indicates the ground-opening plow, which is of ordinary construction, and C indicates the drive-wheel.

D indicates the hopper, which is mounted upon the frame A, and the sides of which incline toward the bottom, as shown.

At the top of the rear side of the hopper is journaled a sprocket-pinion, D', over which passes an endless elevator-chain, E, which at its lowest point passes around a sprocket-wheel, F, secured upon a transverse shaft, F', which turns in suitable bearings on the lower side of the frame A, the said chain passing through an aperture, $d$, in the bottom of the hopper, over the sprocket-pinion D', and down through the discharge or feed spout G, the lower end of the said spout extending down below the frame A to a point in close proximity to the open furrow.

The shaft F' is driven by an endless chain, H, which passes around a sprocket-wheel, $C^2$, on one end of the axle C' of the drive-wheel, beneath a sprocket-wheel, $F^2$, on the shaft F', and around a pulley, I, which is journaled on a stub-axle, I', on the side of the frame A, this arrangement of the drive-chain causing it to turn the shaft F' in the direction indicated by the arrow, Fig. 1.

Upon the elevator-chain E are secured the removable cups K, the said cups being constructed with side flanges, $k$, which fit within longitudinal flanges or projections K', formed on the links of the chain E, the cups being held in their operative position on the links by the pins or set-screws $K^2$, as shown. The cups K are made of different sizes to regulate the amount of seed fed through the spout G into the furrow, larger or smaller cups being employed, according to the quantity of seed which it is desired to sow, while by making the cups or buckets removable the distance at which the seed is sown in the furrow may be regulated by placing the cups at a greater or less distance apart upon the elevator-chain.

When cotton-seed is being sown, the cups may be replaced by teeth, preferably three in each group, with the middle tooth longer than those on each side, these teeth being secured on a base-plate the edges or side flanges of which are adapted to fit in the flanges $k$, formed on the links of the chain E to adapt the said teeth to be secured in their operative position, this arrangement being even better adapted to the cotton-seed than the cups here shown.

A removable slide, L, extends over the main upper portion of the rear side of the hopper over which the elevator-chain passes, and prevents the seed placed in the hopper interfering with the working of the said chain and its buckets or cups.

A brush, M, is secured upon the inner side of the hopper immediately above the opening d, for the purpose hereinafter set forth.

N N indicate covering shovels or plows, which are hung or adjustably connected to each side of the frame A, at the rear of the hopper, being arranged diagonally opposite each other to effect the covering of the seed, a board, N′, being supported by means of the spring-supports N² at the rear of the said shovels to level the ground after the shovels have filled the furrow. A suitable clevis, O, is secured to the front portion of the frame A, as shown.

The operation of my improved planter is as follows: The seed which it is desired to sow being placed in the hopper, the revolutions of the main or drive wheel operate through the before-described mechanism to move the elevator-chain E, each bucket on the same being instantly filled by the seed in the hopper as it enters the hopper through the opening d in the bottom of the same, the flexible teeth of the brush M, which are moved out of the way by the bucket itself as it rises through the said opening, serving to prevent the escape of the seed through the bottom of the hopper, which would otherwise occur. The filled cup or bucket is elevated over the top of the rear side of the hopper, and is inverted as it descends into the spout G, thereby emptying the seed through the spout into the furrow, which has been previously opened by the opening-plow B. The shovels N N and coverer N′ then operate to fill in the furrow and level the earth above the same.

From the foregoing description, taken in connection with the accompanying drawings, the construction and operation of my improved planter will be readily understood without requiring further explanation.

It will be seen that my improved machine may be used for sowing either cotton seed, corn, peas, or beans, and that by its use the exact amount sown and the distance apart at which the seed enters the furrow may be regulated as desired. My invention is also simple in construction, and is therefore inexpensive to manufacture, and not liable to break or get out of order, while, at the same time, it is very efficient in its operation.

Having thus described my invention, what I claim, and desire to secure by Letters Patent of the United States, is—

1. As an improvement in planters, the combination, with the hopper and discharge or feed spout, arranged as described, of the elevator-chain having the longitudinal flanges formed on the links thereof, the removable buckets or teeth formed with the side flanges and adapted to be secured in operative position by the pins or set-screws, the drive-wheel, and intervening mechanism for operating the said elevator-chain from the drive-wheel, all constructed and arranged to operate in the manner and for the purpose shown and described.

2. The combination of the hopper having the shield or slide and provided with the bottom opening protected by the flexible brush or guard, the discharge-spout, the elevator-chain having the longitudinal flanges formed on the links thereof and arranged as described, the removable buckets or teeth formed with the side flanges and adapted to be secured in operative position by the pins or set-screws, the drive-wheel, and intervening mechanism for operating the said elevator-chain from the drive-wheel, all constructed and arranged to operate in the manner and for the purpose herein shown and described.

3. The combination, with the main frame, of the forward shovel, adapted to open the furrow, the hopper and discharge or feed-spout, arranged as described, the elevator-chain having the longitudinal flanges formed on the links thereof and arranged as described, the removable buckets or teeth formed with the side flanges and adapted to be secured in operative position by the pins or set-screws, the drive-wheel, and intervening mechanism for operating the said elevator-chain from the drive-wheel, the covering-shovels, and the auxiliary coverer consisting of a single board supported at the lower ends of the spring-supports, all constructed and arranged to operate in the manner and for the purpose shown and set forth.

In testimony that I claim the foregoing as my own I have hereunto affixed my signature in presence of two witnesses.

KEMP P. ALSTON, Jr.

Witnesses:
S. B. LAWSON,
E. P. BAILEY.